US007345007B2

(12) United States Patent
Kagawa

(10) Patent No.: US 7,345,007 B2
(45) Date of Patent: Mar. 18, 2008

(54) CATALYST FOR SELECTIVE OXIDATION OF CARBON MONOXIDE IN REFORMED GAS

(75) Inventor: Masaru Kagawa, Chiba (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 0 days.

(21) Appl. No.: 10/518,933

(22) PCT Filed: Jun. 24, 2002

(86) PCT No.: PCT/JP02/06279

§ 371 (c)(1),
(2), (4) Date: Jul. 26, 2005

(87) PCT Pub. No.: WO04/000457

PCT Pub. Date: Dec. 31, 2003

(65) Prior Publication Data

US 2005/0288180 A1    Dec. 29, 2005

(51) Int. Cl.
  *B01J 23/42*   (2006.01)
  *B01J 23/08*   (2006.01)
  *B01J 20/00*   (2006.01)
  *B01J 21/04*   (2006.01)
  *B01J 23/02*   (2006.01)

(52) U.S. Cl. ............ 502/327; 502/334; 502/339; 502/355; 502/415; 502/439

(58) Field of Classification Search .............. 502/326, 502/327, 332, 334, 339, 355, 415, 439
See application file for complete search history.

(56) References Cited

U.S. PATENT DOCUMENTS 2,854,404 A * 9/1958 Weisz et al. ............... 208/139
2,959,536 A * 11/1960 Brennan et al. ............ 208/137
3,151,180 A * 9/1964 Myers ....................... 585/660
3,169,993 A * 2/1965 Pickens et al. ............. 564/465
3,331,787 A * 7/1967 Bair et al. .................. 502/223
3,565,830 A * 2/1971 Keith et al. ................ 502/242
3,840,471 A * 10/1974 Acres ........................ 502/177
4,038,175 A * 7/1977 Bhasin ....................... 208/144
4,049,578 A * 9/1977 Reagan et al. .............. 502/74
4,119,567 A * 10/1978 Bartsch ..................... 502/170
4,158,737 A * 6/1979 Bartsch ..................... 560/245
4,172,047 A * 10/1979 Gandhi et al. .............. 502/332
4,200,552 A * 4/1980 Noguchi et al. ............ 502/263
4,224,302 A * 9/1980 Okamoto et al. ........... 423/628

(Continued)

FOREIGN PATENT DOCUMENTS

JP   04-059048   2/1992

(Continued)

*Primary Examiner*—Cam N. Nguyen
(74) *Attorney, Agent, or Firm*—Sughrue Mion, PLLC

(57) ABSTRACT

A catalyst for selectively oxidizing carbon monoxide in reformed gas by oxygen gas is disclosed. The catalyst for selective oxidation of carbon monoxide comprises ruthenium and/or platinum carried by a porous carrier, this porous carrier contains α-alumna, and purity of this alumna is not less than 99.95%.

A particle diameter of the ruthenium and/or platinum is not larger than 200 Å.

According to this catalyst for selective oxidation of carbon monoxide, it is possible to provide the catalyst, which reduces the carbon monoxide in the reformed gas by oxidizing it selectively, and possible to realize excellent efficiency of fuel utilization and favorable generation efficiency.

2 Claims, 2 Drawing Sheets

U.S. PATENT DOCUMENTS

| | | | | |
|---|---|---|---|---|
| 4,237,030 A | * | 12/1980 | Noguchi et al. | 502/207 |
| 4,616,093 A | * | 10/1986 | Kapicak et al. | 560/204 |
| 4,713,363 A | * | 12/1987 | Hucul | 502/262 |
| 4,757,045 A | * | 7/1988 | Turner et al. | 502/252 |
| 4,910,180 A | * | 3/1990 | Berndt et al. | 502/304 |
| 5,145,826 A | * | 9/1992 | Hirschberg et al. | 502/262 |
| 5,164,072 A | * | 11/1992 | Peters | 208/122 |
| 5,378,767 A | * | 1/1995 | Massie | 525/339 |
| 5,395,406 A | * | 3/1995 | Clavenna et al. | 48/198.7 |
| 5,597,772 A | * | 1/1997 | McCabe et al. | 502/332 |
| 5,856,263 A | * | 1/1999 | Bhasin et al. | 502/333 |
| 5,883,038 A | * | 3/1999 | Park et al. | 502/325 |
| 5,997,830 A | * | 12/1999 | Itoh et al. | 423/213.5 |
| 6,248,684 B1 | * | 6/2001 | Yavuz et al. | 502/66 |
| 6,429,167 B1 | * | 8/2002 | Maeno et al. | 502/325 |
| 2002/0077514 A1 | * | 6/2002 | Rossi et al. | 570/226 |
| 2002/0172640 A1 | * | 11/2002 | Hibi et al. | 423/502 |

FOREIGN PATENT DOCUMENTS

| | | |
|---|---|---|
| JP | 2001-017861 | 1/2001 |
| JP | 2001-212458 | 8/2001 |
| WO | WO 00/17097 | 3/2000 |

* cited by examiner

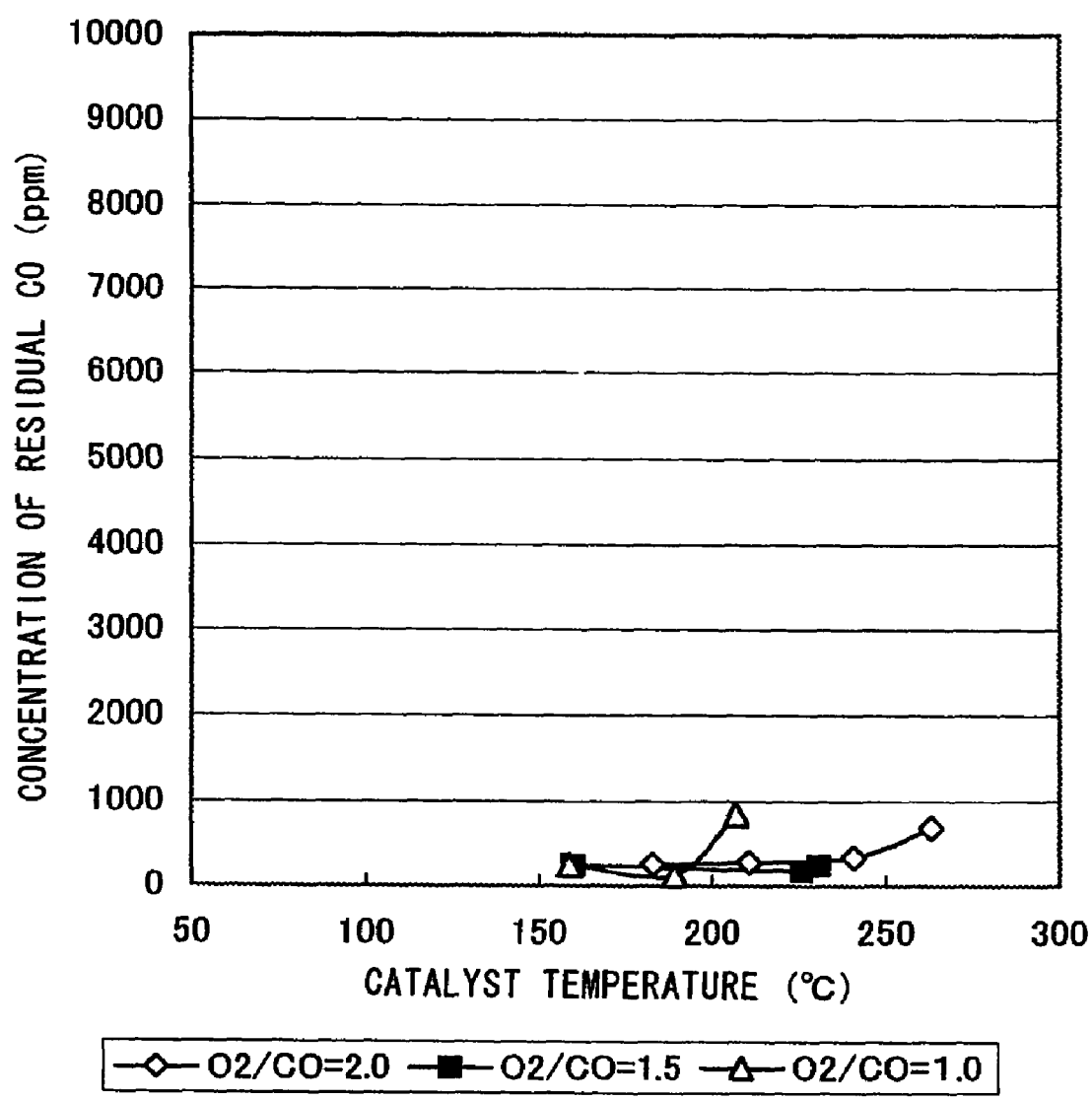
FIG. 1 EXAMPLE 2 (PURITY OF ALUMINA CARRIER:99.995%)

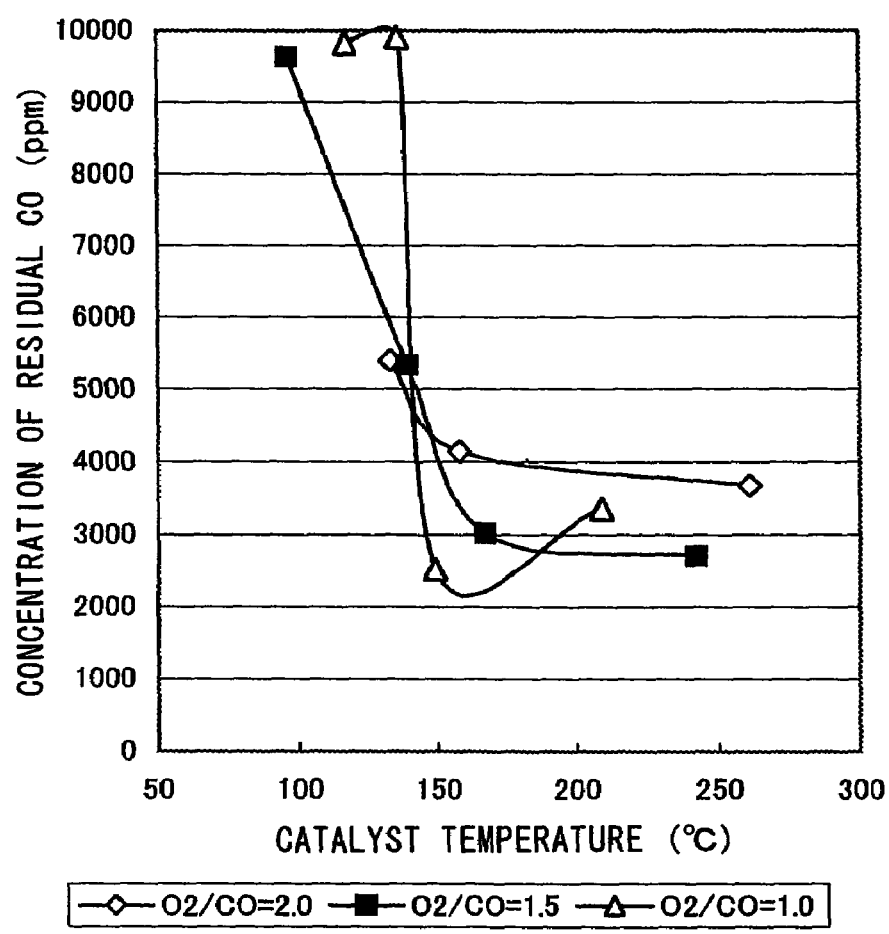
FIG. 2 COMPARATIVE EXAMPLE 1 (PURITY OF ALUMINA CARRIER:99.9%)

CATALYST FOR SELECTIVE OXIDATION OF CARBON MONOXIDE IN REFORMED GAS

TECHNICAL FIELD

This invention relates to a catalyst for selectively oxidizing carbon monoxide in reformed gas, and more particularly to a catalyst for selectively oxidizing the carbon monoxide in reformed gas used for fuel cells operative at low temperature, especially for a polymer electrolyte fuel cell (PECK).

According to the catalyst of this invention, the carbon monoxide in the reformed gas is oxidized selectively, and it is possible to actuate such the fuel cells efficiently even in a low temperature.

BACKGROUND ART

Heretofore, as a fuel gas for the fuel cells, the reformed gas, which is obtained through steam reforming of hydrocarbon such as methane, propane or so in natural gas, alcohol such as methanol, naphtha or the like, has been widely used from an aspect of the cost. The reformed gas of this kind contains carbon monoxide in addition to hydrogen, carbon dioxide or so, it has been known that approximately 1 vol. % of the carbon monoxide is contained even after processing by shift reaction.

Although the secondary produced carbon monoxide of this kind is applied as also fuel in high-temperature working type fuel cells such as a molten carbonate fuel cell (MCFC), the carbon monoxide it has a catalytic poison effect on platinum-based catalysts as the electrode catalysts in a low-temperature working type fuel cells such as a phosphoric acid fuel cell (PAFC) and the polymer electrolyte fuel cell, the catalyst poisoning caused by the carbon monoxide co-existing in the reformed gas is remarkable and a problem of deterioration in generation efficiency arises especially in the polymer electrolyte fuel cell, which is operated in lower temperature as compared with the phosphoric acid fuel cell.

Heretofore, in order to cope with the problem of this kind, alumna catalysts applied with various platinum metals have been proposed.

However, selectivity and activity of the oxidation reaction by oxygen are low in the alumna catalysts applied with such the platinum metals, therefore there is another problem in that hydrogen, which is the main component of the reformed gas and reacts as fuel gas, is also oxidized and dissipated at the same time, thereby causing degradation of utilization factor of the fuel.

Furthermore, it is necessary to supply the reformed gas after reducing the co-existing carbon monoxide into a hundredth of the original amount of approximately 1 vol. % or below in order to obtain the required generation efficiency by using the reformed gas in the polymer electrolyte fuel cell, but the carbon monoxide is not reduced sufficiently by the conventional platinum-alumna based catalysts, and deterioration of the generation efficiency is caused by the remaining carbon monoxide.

DISCLOSURE OF THE INVENTION

The present invention has been made in view of the aforementioned problems in the conventional arts, and it is an object to provide a catalyst for selective oxidation of carbon monoxide, which is possible to reduce the carbon monoxide in the reformed gas by selective oxidation and possible to realize the excellent utilization factor of fuel and the generation efficiency.

As a result of assiduously repeating investigations to attain the aforementioned object, the inventors have found out that excellent selective oxidation of the carbon monoxide is carried out under the condition in which oxygen gas exists excessively against the carbon monoxide by using ruthenium and the like in a state of being carried by porous carrier containing specific high purity $\alpha$-alumna, and accomplished the present invention.

That is, the catalyst for selective oxidation of carbon monoxide according to this invention is a catalyst for selectively oxidizing carbon monoxide in reformed gas with oxygen gas, and characterized by comprising a porous carrier, and ruthenium and/or platinum carried by the porous carrier, this porous carrier contains $\alpha$-alumna, and purity of this alumna is 99.95% or above.

Further, the catalyst for selective oxidation of carbon monoxide according to preferred embodiment of this invention is characterized in that a particle diameter of the ruthenium and/or platinum is 200 Å or below.

Although details of the reason why the selective oxidation catalyst according to this invention exhibits excellent selective oxidizability for the carbon monoxide (CO) is not quite clear, it can be assumed as follows in this time.

In this invention, by using the specified porous carrier, ruthenium (Ru) and/or platinum (Pt) are (is) so structured as to exist in the vicinity (out of pores) of the extreme surface of this carrier as catalytic metals.

The $\alpha$-alumna is not provided with a fine pore differing from $\gamma$-alumna. Accordingly, carried ruthenium (Ru) and/or platinum (Pt) as the catalytic metals become(s) to exist on the surface of the carrier where it is easy to contact with gas comparatively.

By making the catalytic metals to exist sectionally on the surface of alumna in this manner, it seems that it is possible to shift the temperature at which the oxidation of carbon monoxide occures into the low-temperature side and improve the selectivity against the other reaction, whereby it is possible to reduce CO concentration in the reformed gas after the reaction and to prevent the consumption of hydrogen.

Further in this invention, the $\alpha$-alumna can be used suitably as a porous carrier, this $\alpha$-alumna is possible to realize the sectional existence of the aforementioned catalytic metals on the surface, and it is possible to reduce the influence of water vapor contained in the reaction gas by using the $\alpha$-alumna instead of $\gamma$-alumna or silica in addition to above.

In general, water vapor adsorption occurs according to admixture of the water vapor in gas and the temperature at which the oxidation of carbon monoxide occurs is shifted to the high-temperature side, but the shift of reaction temperature toward the high-temperature side caused by the aforementioned adsorption can be avoided by using the $\alpha$-alumna. Consequently, it is considered that it is possible to improve the selectivity of the CO oxidation, to decrease the CO concentration in the reformed gas after the reaction, and possible to prevent the consumption of hydrogen.

Furthermore, the selective oxidation catalyst according to this invention cannot reveal high activity of the CO oxidation until $\alpha$-alumna of extremely high purity is used as the carrier, accordingly it is considered that adsorption form of the reaction gas is changed and the activity is obstructed remarkably if the $\alpha$-alumna is contained with metals or metallic oxides (for example, Na, Si or so) excepting precious metals with catalytic activity, such as Ru, Pt and so on.

Next, detailed explanation will be given concerning the catalyst for selective oxidation of carbon monoxide according to this invention. In this specification, "%" represents a mass percentage unless specified otherwise.

As mentioned above, the catalyst for selective oxidation of carbon monoxide according to this invention is a catalyst for selectively oxidizing carbon monoxide in reformed gas with oxygen gas.

Here, the reformed gas represents generally gas obtained through steam reforming of hydrocarbon such as methane, propane or so, alcohol such as methanol or so, naphtha or the like, on behalf of the reformed gas, methanol reformed gas contains hydrogen gas as the chief ingredient, further contains carbon dioxide ($CO_2$), methane ($CH_4$), water ($H_2O$) and CO.

Among these reformed gases, it is effective as an object gas of this invention to apply the reformed gas after the shift reaction with CO concentration of 1 vol. % or so.

The oxygen gas is not limited so long as it is present in excess of reactive equivalent for CO, and it is typically desirable to make the oxygen present in 1.1~5 times amount of the reactive equivalent for CO.

It is not desirable since CO remains without being oxidized if the oxygen is present in an amount less than 1.1 times, and the consumption of hydrogen sometimes increases when the oxygen is present in an amount more than 5 times.

The catalyst for selective oxidation of CO according to this invention is composed by supporting Ru or Pt, or mixture of Ru and Pt by the porous carrier containing α-alumna.

Ru has an excellent ability as an oxidation catalyst and takes charge of selective oxidation of CO by oxygen, and it is also possible to blend Pt having the similar ability of oxidation catalyst.

The α-alumna contained in the porous carrier is required to be extremely high pure, concretely the alumna concentration is necessary to be 99.95% or above. If the porous carrier is contaminated by impurities such as Na, Si, Fe and the like of the order of hundreds PPM in any state, it is undesirable in the catalytic activity.

Further, in the catalyst for selective oxidation of CO according to this invention, it is desirable to contain Ru and Pt in the proportion of 0.01 to 10%. In other word, the amount of the absorbed mixture of Ru and Pt is desirable to be 0.01 to 10% of the obtained catalyst in whole body and it is preferable to be 0.02 to 0.5%.

When the amount of the absorbed mixture is lower than 0.02%, the oxidation activity for CO may be insufficient, and Ru and/or Pt may be not utilized effectively.

Furthermore, in the selective oxidation catalyst according to this invention, it is desirable that a grain diameter of at least one of Ru and Pt carried by the porous carrier is not larger than 200 Å, and in a range of 5-200 Å preferably.

The grain diameter larger than 200 Å sometimes makes the oxidation activity for CO insufficient, and is not desirable.

As the porous carrier, from a viewpoint of effectively inducing the contact of gas with Ru, Pt or Ru—Pt mixture, the carrier having pores with too small diameter is undesirable. In a case where Ru or so is situated on the inside of pores of the carrier, contacting efficiency of gas is sometimes degraded and an expected effect becomes impossible to be obtained.

As described above, in the selective oxidation catalyst according to this invention, the α-alumna can be applied suitably as a carrier because the α-alumna is possible to realize the aforementioned surface existence of the catalytic metal(s) easily, and possible to decrease the influence of water vapor as mentioned above.

The α-alumna is able to be used singly, and also possible to be used together with alumna having the other crystal system.

Although the γ-alumna changes into α-alumna by keeping in a temperature of 1000° C. or above, Ru and Pt as catalytic metals show sintering by keeping them in this temperature and the catalytic activity becomes insufficient, therefore the γ-alumna is not suitable to be applied to the catalyst of this invention. However, it is possible to use the alumna of γ, θ, η-type or the like as a carrier after the phase transition into α-alumna through the heat treatment before supporting Ru, Pt or the like having catalytic activity, and to use high purity alumna with various crystal systems satisfying the above-mentioned properties together with the α-alumna.

The selective oxidation catalyst according to this invention has the construction as mentioned above and the excellent selective oxidizability for CO, and removes CO on the order of 1 vol. % co-existing in the reformed gas down to 100 ppm or so by oxidation.

Although the working condition of the catalyst is also not limited especially, remarkable effects are obtained by setting space velocity (SV) into 30,000 $h^{-1}$ or below, and controlling the catalyst temperature within a range of 100~200° C.

Furthermore, the catalyst form is also not limited especially, and it is possible to form in a granular type, a pellet type and a monolith type, and further possible to use by coating on a honeycomb-shaped monolith carrier made of cordierite, metal and the like.

BRIEF DESCRIPTION OF THE DRAWINGS

FIG. 1 is a graph illustrating catalytic activity of an example of the selective oxidation catalyst for CO according to this invention;

FIG. 2 is a graph illustrating catalytic activity of the selective oxidation catalyst for CO disaccording to this invention.

BEST MODE FOR CARRYING OUT THE INVENTION

Next, this invention will be further explained in detail with reference to the following examples and comparative examples, however this invention is not limited to these examples.

[Performance Evaluation]
In the following examples and comparative examples, the performance of the obtained catalyst was evaluated by the following method.

(Evaluation Condition etc.)
Evaluation Apparatus; Fixed Bed—Ventilation Type
SV; 30000 $h^{-1}$
CO concentration; 1 vol. %
$O_2$/CO; 2.0, 1.5, 1.0 (volume ratio)
Hydrogen Concentration; 40%
Water Vapor Concentration; Approximately 30%
Carbon Dioxide Concentration; 20%
Methane Concentration; 2.5%
Reaction Temperature; 100~250° C.

(Grain Diameter of Catalytic Metal)
The grain diameter was certified by directly observing the supported metal through the transmission electron microscope after pulverizing the catalyst.

(Surface Concentration of Catalytic Metal)
The concentration of the precious metal on the surface was certified by studying the surface of the catalyst through XPS.

(Distribution of Catalytic Metal)
The width of supported Catalytic Metal was confirmed by studying a section of the catalyst cracked about in half.

EXAMPLE 1

A selective oxidation catalyst A according to this example was obtained by supporting Ru of about 0.2% on extra-high purity α-alumna (alumna concentration: 99.995%) with average grain diameter of about 2 mm.

As a result of passing test gas, which is obtained by adding oxygen of 2.0 vol. % into the reformed gas containing carbon monoxide of 1 vol. %, through the aforementioned selective oxidation catalyst at space velocity (SV) of 30000 $h^{-1}$, the CO concentration was reduced to 100 ppm or below in a temperature range of the catalyst layer of 100~250° C.

EXAMPLE 2

A selective oxidation catalyst according to this example was obtained by supporting Ru in a ratio of 2 g/l on extra-high purity α-alumna pellets (alumna concentration: 99.995% or above) with average grain diameter of about 2 mm.

Residual CO concentration was measured by supplying test gases of which $O_2$/CO is 2, 1.5 and 1 in volume ratio into the obtained selective oxidation catalyst, in SV=60000 $h^{-1}$ at 150° C. The obtained results are shown in FIG. 1. In the all test gases differing in $O_2$/CO ratio, the oxidation of CO was started in the neighborhood of 150° C. and CO was reduced down to 100 from 200 ppm.

COMPARATIVE EXAMPLE 1

A selective oxidation catalyst of this example was obtained by supporting Ru in a ratio of 2 g/l on the extra-high purity α-alumna (alumna concentration: 99.9%) with average grain diameter of about 2 mm.

The residual CO concentration was measured by supplying test gases of which $O_2$/CO is 2, 1.5 and 1 in volume ratio into the obtained selective oxidation catalyst, at space velocity (SV) of 60000 $h^{-1}$ and 150° C. The obtained results are shown in FIG. 2. In the all test gases differing in $O_2$/CO ratio, the oxidation of CO was started in the neighborhood of 150° C., but CO was not reduced down to 2000 ppm or below.

COMPARATIVE EXAMPLE 2

A selective oxidation catalyst according to this example was obtained by supporting Ru of about 0.2% on γ-alumna (alumna concentration: 99.995% or above) with average grain diameter of about 2 mm. In this catalyst, Ru was confirmed to be distributed as far as on the inside of pores of the alumna, and the surface concentration of Ru was lower than that of catalyst used with the α-alumna.

As a result of passing test gas mixed with oxygen of 2.0 vol. % into the reformed gas containing carbon monoxide of 1 vol. % through the catalyst at space velocity (SV) of 60000 $h^{-1}$, the oxidation of CO was started when the temperature of the catalyst layer was in the neighborhood of 140° C., CO was reduced down to 2000 ppm or so at 150° C., and the CO concentration was reduced down to about 1000 ppm along with a rise in the temperature in a temperature range higher than 150° C.

Although the present invention has been described above in detail on basis of the preferred examples, this invention is not limited to these examples, and it is possible to practice in various forms in a scope disclosed in this invention.

For example, the purpose of the selective oxidation catalyst according to this invention is not limited to the reformed gas supplied to the polymer electrolyte fuel cell, it is possible to use for reducing CO in the other reformed gases, and further possible to apply to various process, such as ammonia synthesis which is required for high purity hydrogen, or the like.

INDUSTRIAL APPLICABILITY

As mentioned above, according to this invention, ruthenium or the like is used in the state of being carried and supported by the porous carrier containing specific high-purity α-alumna, it is possible to provide the selective oxidation catalyst for carbon monoxide which reduces carbon monoxide in the reformed gas by oxidizing it selectively, and realizes excellent efficiency of fuel utilization and satisfactory generation efficiency.

For example, it is possible to reduce carbon monoxide existing in the order of 1 vol. % in the reformed gas down to 0.1 vol. % or below by making reaction in presence of excessive oxygen at 150° C. or so using the catalyst according to this invention.

The invention claim is:

1. A catalyst for selectively oxidizing carbon monoxide in reformed gas with oxygen gas, the catalyst comprising a porous carrier, and ruthenium and/or platinum particles carried by said porous carrier,
   wherein said porous carrier consists substantially of α-alumina, does not contain Θ-alumina, and the purity of said alumna is 99.95% or above.

2. The catalyst as set forth in claim 1, wherein the particle diameter of said ruthenium and/or platinum is 5 to 200Å.

* * * * *